UNITED STATES PATENT OFFICE.

ADAM H. PRENZEL, OF HALIFAX, PENNSYLVANIA, ASSIGNOR TO UNITED SHOE MACHINERY COMPANY, OF PATERSON, NEW JERSEY, A CORPORATION OF NEW JERSEY.

SHOE-FILLER COMPOSITION.

1,217,214.

Specification of Letters Patent. Patented Feb. 27, 1917.

No Drawing. Application filed June 10, 1915. Serial No. 33,264.

*To all whom it may concern:*

Be it known that I, ADAM H. PRENZEL, a citizen of the United States, residing at Halifax, in the county of Dauphin and State of Pennsylvania, have invented certain new and useful Improvements in Shoe-Filler Compositions, of which the following is a specification.

This invention relates to an improved shoe filler composition.

It has heretofore been proposed to employ for shoe fillers, compositions of a waxy nature, which are usually applied hot or require the presence of heat for the application thereof to the shoe bottom. In practice these have been found to be unsatisfactory in that they injure the leather, stitching, and adjacent fabric of the shoe, that they shrink, leaving a space between the parts, and that they are sensitive to heat and in use become soft and lose their shape. Fillers that contain rosin, resinous products, or vegetable oils, owing to the presence of these substances, have a tendency to make shoes squeak, and furthermore the use of rosin, tarry and pitchy substances in fillers causes the same to draw the feet. Various other compositions have also been employed, but these fail to answer the requirements in many respects, and among other defects are inflammable or explosive, which presents a great disadvantage in the use thereof.

The primary object of the present invention is to provide an improved shoe filler, which can be very cheaply produced and will be entirely free from the objections referred to, one capable of being applied in a cold state, that will vulcanize or cure quickly in a cold state, that will be adherent to leather, that will be non-inflammable, that when placed in a shoe will prevent squeaking, and that will be similar to rubber vulcanized in the usual way, resilient, unaffected by cold or any reasonable degree of heat, and water repellent, but differing from rubber in being free from the drawing tendency thereof.

My improved shoe filler consists of a rubber solution, a large proportion of filling material such as comminuted cork or cork dust, a small percentage of a vulcanizing material as sulfur, and gutta percha and carbon tetrachlorid. A coloring material, such as Venetian red or lamp black may also be added. The rubber solution is formed by dissolving rubber in benzol, high grade gasolene, naphtha, or like inflammable solvent.

The following is a formula which I prefer and which I have found in practice to give particularly good results. It will be understood that the proportion of the various ingredients may be varied within certain bounds and that while I have specifically mentioned certain materials, the invention in its broader aspect covers the use in the composition of known equivalents for the materials specifically referred to and which may be substituted in the composition therefor.

| | |
|---|---|
| Cork dust | 150 parts |
| Rubber | 125 " |
| Sulfur | 12 " |
| Venetian red, or lamp black | 9 " |
| Magnesia | 3 " |
| Gasolene or benzol | 550 " |
| Gutta-percha | 6 " |
| Carbon tetrachlorid | 16 " |

In making the composition, rubber is dissolved in benzol, high grade gasolene, naphtha, or like solvent. The rubber is placed in a churn with the solvent, and permitted to soak over night and the solution is then subjected for several hours to the action of the churn. The solution is removed from the churn in the form of liquid cement and placed in a mixing machine with a large proportion of filling material such as comminuted cork or cork dust, a small percentage of sulfur, magnesia, gutta-percha and carbon tetrachlorid. A coloring material such as Venetian red or lamp black may also be added. The whole is thoroughly mixed and kneaded together, the carbon tetrachlorid being added just before the completion of the mixing operation before removing the mixture from the mixing machine.

While I prefer to subject the solution, resulting from the soaking of the rubber in the benzol over night, to the action of a churn to effect a more thorough or complete saturation and mixing of the rubber with the solvent, the churning step may be omitted, the solution, (without churning) being placed directly in the mixer with the other ingredients.

The mixture thus produced constitutes the filler composition. It is non-inflammable and is of a consistency capable of being spread in a cold state by hand. It is tenacious and will strongly adhere to leather. It is adapted to be applied cold and when spread in a thin layer and exposed to the atmosphere it cures quickly, the benzol evaporates and vulcanization takes place. The mixture when applied to the leather sole enters into, combines and coalesces with the leather, becoming closely and firmly united therewith. The cured layer is like rubber vulcanized in the usual way, resilient, unchangeable in form, unaffected by cold or any reasonable degree of heat, and water repellent. It differs, however, from rubber in not having the drawing tendency thereof and when placed in the shoe between the soles will prevent the shoe from squeaking in use.

The sulfur in the mixture is instrumental in effecting a cold cure and is assisted by the magnesia. The tenacity and ability of the mixture to closely combine with and adhere to the leather is materially abetted by the gutta percha.

The carbon tetrachlorid performs several important functions and is a highly essential element in the composition. It serves to render the composition non-inflammable and counteracts or prevents the natural tendency of the rubber to draw.

It will be observed that heat is unnecessary throughout the process either in the preparation and mixing of the ingredients or in the application of the filler to the shoe bottom. In order to vary the time of curing of the filler to suit different requirements, different grades of benzol may be used, the fast, medium, or slow. Benzol and high grade gasolene can be used together, or to reduce the cost still more, the high grade gasolene can be used alone.

It will also be observed that the filler is composed largely of comminuted filler material such as cork so that the same is cheap and light in construction.

The composition can be safely stored in cans and can be preserved in this way for a long time for future use.

While the composition produced is especially advantageous as a filler for the cavity of the inner sole of shoes, it will be understood that the same may be employed for various other purposes, for instance it may be advantageously used as a box toe filler.

The method of making the shoe filling material and the shoe filled with said material are not claimed herein but form the subject-matter respectively of my co-pending applications Serial No. 33,265, filed June 10, 1915 and Serial No. 34,277, filed June 15, 1915.

What I claim is:

1. A filling material for shoes comprising a solution of rubber in a solvent, a comminuted solid, carbon tetrachlorid, and sulfur, the proportions being such that the resulting mixture is plastic and adapted to vulcanize quickly when spread on the bottom of the insole of a shoe.

2. A filling material for shoes comprising a solution of rubber in a solvent, comminuted cork, carbon tetrachlorid, and sulfur, the proportions being such that the resulting mixture is plastic and adapted to vulcanize quickly when spread on the bottom of the insole of a shoe.

In testimony whereof I hereunto affix my signature in the presence of two witnesses.

ADAM H. PRENZEL.

Witnesses:
JAS. E. NEITZ,
G. W. SHULTZ.